(12) United States Patent
Horiguchi (10) Patent No.: US 10,440,209 B2
(45) Date of Patent: Oct. 8, 2019

(54) IMAGE READING DEVICE AND IMAGE FORMING APPARATUS INCLUDING SAME

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/017,618

(22) Filed: Jun. 25, 2018

(65) Prior Publication Data

US 2019/0007572 A1   Jan. 3, 2019

(30) Foreign Application Priority Data

Jun. 29, 2017   (JP) ................................. 2017-127474

(51) Int. Cl.
*H04N 1/00* (2006.01)
*H04N 1/23* (2006.01)

(52) U.S. Cl.
CPC ..... *H04N 1/00824* (2013.01); *H04N 1/00761* (2013.01); *H04N 1/00814* (2013.01); *H04N 1/00835* (2013.01); *H04N 1/2346* (2013.01)

(58) Field of Classification Search
CPC ............. H04N 1/00824; H04N 1/2346; H04N 1/00761; H04N 1/00814; H04N 1/00835

USPC ........................................................ 358/1.13
See application file for complete search history.

(56) References Cited

U.S. PATENT DOCUMENTS

2010/0232711 A1* 9/2010 Takeshima ........... G03B 27/527
382/206

FOREIGN PATENT DOCUMENTS

JP          2011-077648 A      4/2011

* cited by examiner

*Primary Examiner* — Saeid Ebrahimi Dehkordy
(74) *Attorney, Agent, or Firm* — Stein IP, LLC (57) ABSTRACT

An image reading device includes an original document transport device, a first reading module and a control portion. When the control portion performs the light source turning-on confirmation processing of the first reading module, the control portion performs first opening/closing determination processing for determining the state of the opening and closing of a cover member, light amount acquisition processing for turning on a light source so as to acquire light amount data after it is determined in the first opening/closing determination processing that the cover member is in a closed state, second opening/closing determination processing for determining again the state of the opening and closing of the cover member after the acquisition of the light amount data in the light amount acquisition processing and light amount determination processing for determining the light amount after it is determined that the cover member is in the closed state.

8 Claims, 4 Drawing Sheets

IMAGE READING DEVICE AND IMAGE FORMING APPARATUS INCLUDING SAME

INCORPORATION BY REFERENCE

This application is based upon and claims the benefit of priority from the corresponding Japanese Patent Application No. 2017-127474 filed on Jun. 29, 2017, the entire contents of which are incorporated herein by reference.

BACKGROUND

The present disclosure relates to an image reading device which is used in a digital copying machine, an image scanner or the like and which scans an original document so as to read it, and to an image forming apparatus which includes such an image reading device.

Conventionally, as an image reading device incorporated in a multifunctional machine using an electrophotographic process or the like, there is an image reading device that includes an original document transport device (Automatic Document Feeder) which sequentially feeds a sheet-shaped original document to an original document placement stage (contact glass) in order to read the original document and which ejects it from the top of the original document placement stage after the completion of the reading. In the image reading device as described above, two types of reading methods can be adopted that are: a sheet-through method in which in a state where a reading module is fixed to an image reading position, the original document is automatically transported by the original document transport device and is read; and an original document fixing method in which each time the original document is read, an original document holder is opened and closed, in which the reading module is moved so as to perform scanning while the original document on the original document placement stage is replaced on an individual sheet basis and in which the original document placed on the original document placement stage is read.

In recent years, in the sheet-through method described above, a double-sided simultaneous reading method has been mainly used in which the front surface and the back surface of a double-sided original document are simultaneously read with individually different reading modules by performing an original document transport operation once with the original document transport device. The reading module for reading the back surface of the double-sided original document is arranged on the side of the original document transport device. In the original document transport device, a cover member is provided in which part of an original document transport path can be opened so that jam processing on the original document is performed.

In the image reading device, there are various types of processing which are necessary for the initial setting and the adjustment and the like of the reading module, and as one of the types of processing, light source turning-on confirmation processing is present in which the light amount data of light reflected from a white reference plate arranged opposite the reading module when a light source incorporated in the reading module is turned on is acquired and in which whether the light source is normal or abnormal is determined.

On the other hand, in the image reading device of the double-sided simultaneous reading method, a configuration is known in which with consideration given to a space within the original document transport device, convenience at the time of cleaning in a reading position and the like, the reading module for reading the back surface of the double-sided original document is arranged in the opening/closing portion of the cover member. The white reference plate is attached to the side of the cover member through the original document transport path, and when the cover member is opened, the reading module and the white reference plate are separated from each other.

In the configuration described above, in a state where the cover member is opened, even when the light source is normally turned on, the reading module cannot receive the light reflected from the white reference plate, and thus it is erroneously detected that the light source is not turned on or that an abnormally occurs in the turning on of the light source. Alternatively, even when the light source is not turned on, in the state where the cover member is opened, the reading module inevitably receives ambient light, and thus it is likely that an error cannot be detected.

An image reading device is known which determines whether or not image reading can be performed according to the result of detection of the opening and closing of an original document transport device for an image reading device and the intensity of external light detected by an external light detection means.

SUMMARY

An image reading device according to one aspect of the present disclosure includes an original document transport device, a first reading module and a control portion. The original document transport device includes an original document transport path along which an original document is passed, a cover member which can be opened and closed in a predetermined section of the original document transport path, an opening/closing detection sensor which detects a state of the opening and closing of the cover member and a white reference plate which is arranged in the cover member and which is opposite a first reading module in a state where the cover member is closed. The first reading module is arranged within the original document transport device, includes a light source and a sensor for reading, as image light, light which is applied from the light source to the transported original document and which is reflected off the transported original document. The control portion can perform light source turning-on confirmation processing of the first reading module in which the light source is turned on in a state where the white reference plate is opposite the first reading module such that light amount data is acquired with the sensor and in which a state of the turning on of the light source is determined based on whether or not the acquired light amount is equal to or more than a reference value. When the control portion performs the light source turning-on confirmation processing, the control portion sequentially performs first opening/closing determination processing for determining the state of the opening and closing of the cover member based on a result of the detection by the opening/closing detection sensor, light amount acquisition processing for turning on the light source so as to acquire the light amount data after it is determined in the first opening/closing determination processing that the cover member is in a closed state, second opening/closing determination processing for determining again the state of the opening and closing of the cover member based on a result of the detection by the opening/closing detection sensor after the acquisition of the light amount data in the light amount acquisition processing and light amount determination processing for determining, after it is determined in the second opening/closing determination processing that the cover member is in the closed state, whether or not the light amount is equal to or more than the reference value.

Further other objects of the present disclosure and specific advantages obtained by the present disclosure will become more apparent from the description of an embodiment which will be described below.

DETAILED DESCRIPTION

Figure 1:
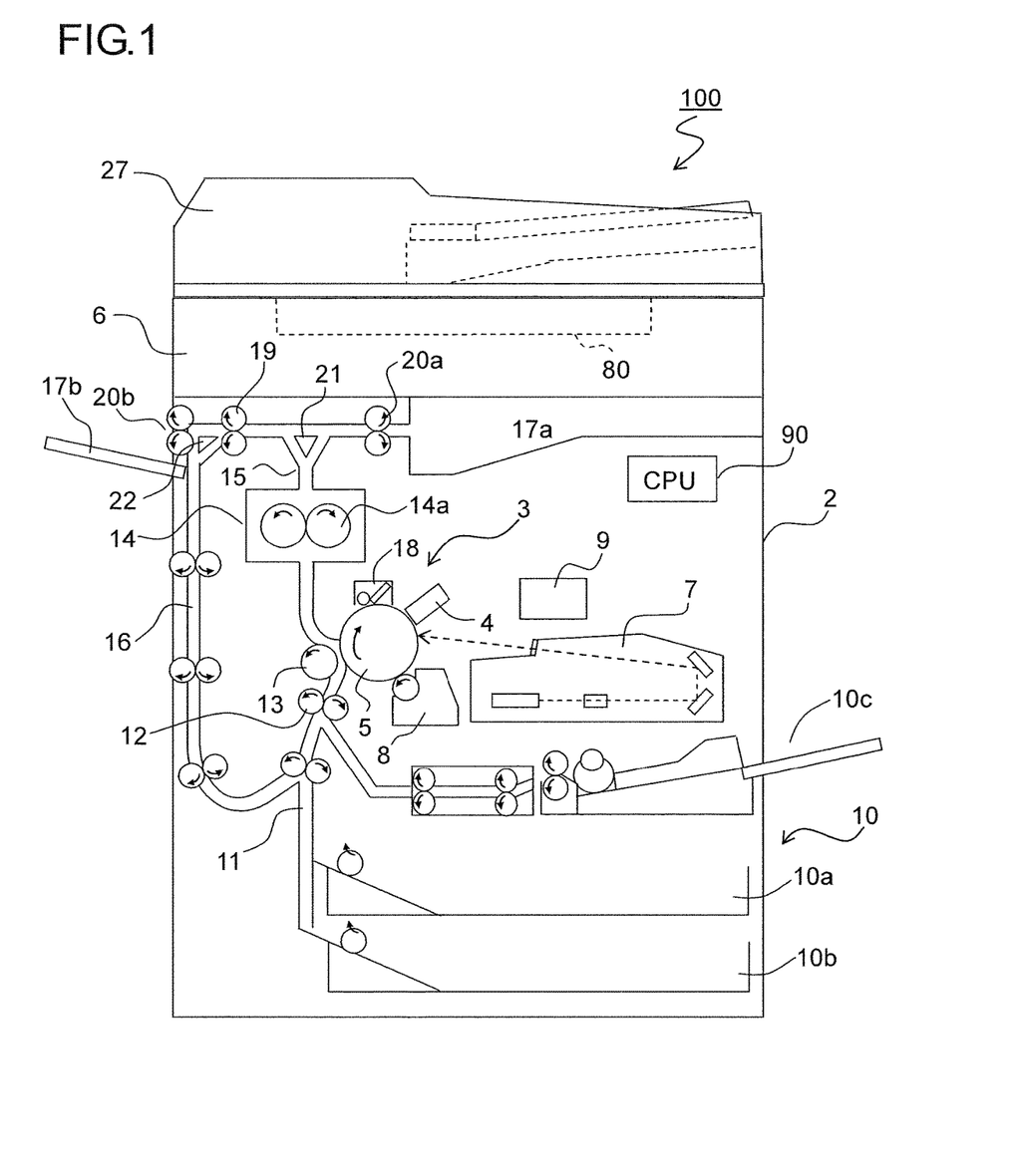
FIG. 1 is a side cross-sectional view showing the overall configuration of an image forming apparatus which includes an image reading device of the present disclosure.

An embodiment of the present disclosure will be described below with reference to drawings. FIG. 1 is a schematic configuration diagram of an image forming apparatus 100 which includes an image reading portion 6 in the present disclosure. In FIG. 1, when the image forming apparatus 100 (here, a digital multifunctional machine is shown as an example) performs a copying operation, in the image reading portion 6 which will be described later, the image data of an original document is read and is converted into image signals. On the other hand, in an image forming portion 3 within the main body 2 of the multifunctional machine, a photosensitive drum 5 which is rotated in a clockwise direction in the figure is uniformly charged by a charging unit 4. Then, an electrostatic latent image based on the image data of the original document read in the image reading portion 6 is formed on the photosensitive drum 5 by a laser beam from an exposure unit (a laser scanning unit and the like) 7. A developer (hereinafter referred to as a toner) is adhered to the formed electrostatic latent image by a developing unit 8 so as to form a toner image. The toner is supplied to the developing unit 8 from a toner container 9.

Toward the photosensitive drum 5 on which the toner image is formed as described above, a sheet is transported from a paper feed mechanism 10 through a sheet transport path 11 and a registration roller pair 12 to the image forming portion 3. The transported sheet is passed through a nip portion between the photosensitive drum 5 and a transfer roller 13 (image transfer portion), and thus the toner image on the surface of the photosensitive drum 5 is transferred thereto. Then, the sheet to which the toner image is transferred is separated from the photosensitive drum 5 and is transported to a fixing portion 14 which includes a fixing roller pair 14a, and the toner image is fixed. The sheet passed through the fixing portion 14 is transported to a sheet transport path 15 which is branched in a plurality of directions. The transport direction of the sheet is directed by route switching mechanisms 21 and 22 which are provided in the branch points of the sheet transport path 15 and which have a plurality of route switching guides, and the sheet is ejected without being processed (or after being fed to a reverse transport path 16 so as to be subjected to double-sided copying) to a sheet ejection portion formed with a first ejection tray 17a and a second ejection tray 17b.

Although not shown in the figure, a static elimination device which eliminates residue charge on the surface of the photosensitive drum 5 is provided on the downstream side of a cleaning device 18 with respect to the rotation direction of the photosensitive drum 5. Furthermore, the paper feed mechanism 10 includes a plurality of paper feed cassettes 10a and 10b which are removably attached to the main body 2 of the multifunctional machine and in which sheets are stored and a stack bypass (manual feed tray) 10c which is provided thereabove. The paper feed mechanism 10 is connected with the sheet transport path 11 to the image forming portion 3 formed with the photosensitive drum 5, the developing unit 8 and the like.

The image reading portion 6 is arranged in an upper portion of the main body 2 of the multifunctional machine, and an original document transport device 27 is provided on the upper surface of the main body 2 of the multifunctional machine. The lower surface of the original document transport device 27 also serves as a platen (original document holder) which holds and retains the original document placed on a contact glass 25 (see FIG. 2) in the image reading portion 6. An operation portion 80 is provided on the front surface of the image reading portion 6. In the operation portion 80, a liquid crystal display portion and LEDs are provided, and thus the state of the image forming apparatus 100 is indicated, and conditions of image formation and the number of printed sheets are displayed. In addition, in the operation portion 80, a start button with which a user provides an instruction to start the image formation, a stop/clear button which is used such as when the image formation is stopped, a reset button which is used when various types of settings in the image forming apparatus 100 are brought into a default state and the like are provided.

Specifically, the sheet transport path 15 is first branched into two left and right routes on the downstream side of the fixing roller pair 14a, and one route (in FIG. 1, the route branched in a rightward direction) is formed so as to communicate with the first ejection tray 17a. The other route (in FIG. 1, the route branched in a leftward direction) is passed through a transport roller pair 19 and is branched into two routes, and one route (in FIG. 1, the route branched in the leftward direction) is formed so as to communicate with the second ejection tray 17b. On the other hand, the other route (in FIG. 1, the route branched in a downward direction) is formed so as to communicate with the reverse transport path 16.

Furthermore within the main body 2 of the multifunctional machine, a control portion (CPU) 90 is arranged which controls the operations of the image forming portion 3, the image reading portion 6, the original document transport device 27 and the like.

Figure 2:
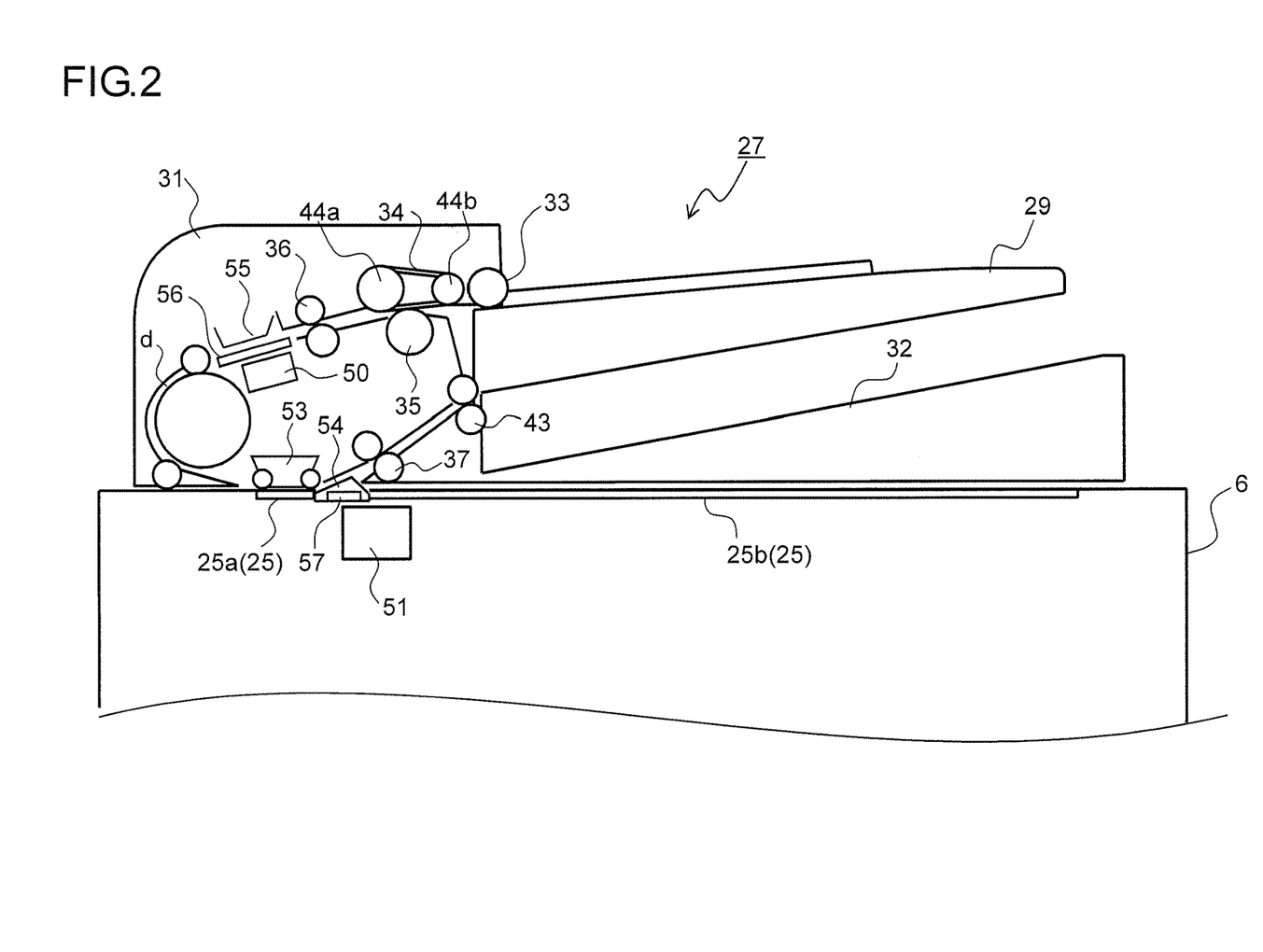
FIG. 2 is a side cross-sectional view showing the internal structures of an image reading portion and an original document transport device which automatically transports an original document to the image reading portion according to an embodiment of the present disclosure.
Figure 3:
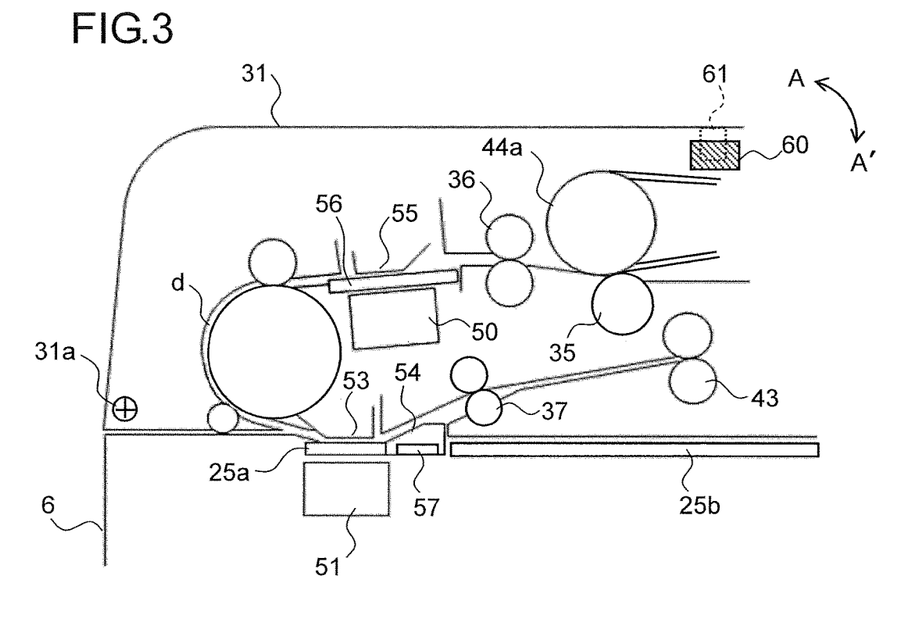
FIG. 3 is a partial enlarged view showing a structure within a cover member in the original document transport device shown in FIG. 2.

FIG. 2 is a side cross-sectional view showing the internal structures of the image reading portion 6 and the original document transport device 27 which automatically transports the original document to the image reading portion 6 according to one-embodiment of the present disclosure, and FIG. 3 is a partial enlarged view showing a structure within a cover member 31 in the original document transport device 27. On the upper surface of the image reading portion 6, the contact glass 25 is arranged which is formed with an automatic reading glass 25a and a manually placed original document glass 25*b*. Between the automatic reading glass 25*a* and the manually placed original document glass 25*b*, a transport guide 54 is arranged which scoops up the tip end of the original document transported by the original document transport device 27.

The cover member 31 of the original document transport device 27 is supported such that the cover member 31 can be turned in the direction of arrows AA' with respect to the frame (unillustrated) of the original document transport device 27 with a turning shaft 31*a* on the side of the side surface of the device (the left side of FIG. 3) serving as a support point. Within the cover member 31, an original document transport path d is formed which is extended from an original document paper feed tray 29 to an original document ejection tray 32. Along the original document transport path d, original document transport members which are formed with a pickup roller 33, a paper feed belt 34 and a separation roller 35, a registration roller pair 36, a transport roller pair 37, an ejection roller pair 43 and the like and a back surface reading module 50 which reads an image on the side of the back surface of the original document are provided.

A back surface reading glass 56 is arranged adjacent to the back surface reading module 50. The back surface reading glass 56 forms part of the inner wall surface of the original document transport path d. Furthermore, in a position opposite the back surface reading glass 56 through the original document transport path d, a back surface white reference plate 55 for the shading correction of the back surface reading module 50 is arranged. The back surface white reference plate 55 is attached to the inner side of the cover member 31, and is arranged in a position separated from the back surface reading glass 56 or in a position opposite the back surface reading glass 56 according to whether the cover member 31 is opened or closed.

The original document transport path d is curved so as to be reversed while the original document transport path d is extended from the registration roller pair 36 to the automatic reading glass 25*a*. In the original document transport path d, a plurality of sheet detection sensors (unillustrated) which include a paper feed sensor and an ejection sensor for detecting whether or not the original document is present and the passing thereof are provided in appropriate places.

Within the cover member 31, an opening/closing detection sensor 60 is arranged which detects whether the cover member 31 is opened or closed. The opening/closing detection sensor 60 is a PI (photo interrupter) sensor which includes a detection portion that includes a light emission portion and a light reception portion. As shown in FIG. 3, when the cover member 31 is in a closed position, in the opening/closing detection sensor 60, light is interrupted by a light interruption plate 61 provided on the side of the cover member 31, with the result that the light reception signal level of the detection portion is in a low state. When the cover member 31 is turned from the state of FIG. 3 in the direction of opening (upper direction), the light interruption plate 61 is retracted upward from the detection portion of the opening/closing detection sensor 60, with the result that the light reception signal level of the detection portion is brought into a high state. The light reception signal of the opening/closing detection sensor 60 is transmitted to the control portion 90 (see FIG. 1), and thus whether the cover member 31 is opened or closed is detected.

Within the image reading portion 6, a front surface reading module 51 is arranged. The front surface reading module 51 reads an image on the original document placed on the manually placed original document glass 25*b* while being moved in a subscanning direction (the left/right direction of FIG. 2). The front surface reading module 51 also reads an image on the side of the front surface of the original document transported by the original document transport device 27 in a state where the front surface reading module 51 is stopped immediately below the automatic reading glass 25*a*. In a lower portion of the transport guide 54, a front surface white reference plate 57 for the shading correction of the front surface reading module 51 is arranged.

An original document transport operation of a sheet-through method using the original document transport device 27 will then be described. In the sheet-through method, a plurality of sheets in an original document are set on the original document paper feed tray 29 with an image plane directed upward. Thereafter, when a copy start button in the operation portion 80 (see FIG. 1) of the image forming apparatus 100 is turned on, a lift plate (unillustrated) which is raised by a raising/lowering mechanism (unillustrated) pushes up the pickup roller 33 through the original document. Consequently, the weight of a frame member (unillustrated) including the pickup roller 33 is applied to the lift plate, and thus the upper surface of the original document is pressed onto the pickup roller 33 with a predetermined pressure (paper feed pressure).

Here, the pickup roller 33, a drive roller 44*a*, a driven roller 44*b* and the paper feed belt 34 are arranged in the unillustrated frame member. The pickup roller 33 is coupled to the drive roller 44*a* with an unillustrated gear. When the drive roller 44*a* is rotated by a roller drive motor (unillustrated), the paper feed belt 34 which is stretched over the drive roller 44*a* and the driven roller 44*b* is driven to rotate, and the pickup roller 33 is also driven to rotate.

A plurality of upper sheets in the original document set on the original document paper feed tray 29 are normally fed by the pickup roller 33 into a nip portion between the paper feed belt 34 and the separation roller 35. Then, only the uppermost sheet is separated from the sheets in the original document by the separation roller 35 and is transported toward the registration roller pair 36. At that time, the original document is transported only a predetermined distance after the tip end of the original document is detected with the paper feed sensor, and thereafter the rotary drive of the pickup roller 33 and the paper feed belt 34 is stopped by the stop of the operation of the roller drive motor, with the result that the primary paper feed is completed. The tip end of the original document after being subjected to the primary paper feed is stopped in the nip portion of the registration roller pair 36 in a state where a deformation is formed.

A predetermined time elapses after the completion of the primary paper feed, and thereafter the second paper feed is started. Specifically, the registration roller pair 36 is driven to rotate by the operation of a second paper feed drive motor (unillustrated). The original document is transported by the registration roller pair 36 and the transport roller pair 37 toward the automatic reading glass 25*a*. The original document transported to the automatic reading glass 25*a* makes contact with an original document holder member 53 which is arranged opposite the automatic reading glass 25*a*, and is thereby pressed onto the automatic reading glass 25*a* from above. Then, the image on the side of the front surface of the original document (the side of the automatic reading glass 25*a*) is read through the automatic reading glass 25*a* by the front surface reading module 51.

Thereafter, the original document passed through the automatic reading glass 25*a* is transported through the transport guide 54 toward the transport roller pair 37 and the ejection roller pair 43 and is then finally ejected by the ejection roller pair 43 onto the original document ejection tray 32. At that time, the passing of the back end of the original document is detected by the ejection sensor, and thus the completion of the reading of the image of one sheet in the original document is detected. Here, the ejection sensor has the count function of counting the number of sheets in the original document each time the transport of the original document is completed, and when the paper feed sensor detects the subsequent original document, the transport of the second and subsequent sheets in the original document is performed in the same manner as described above.

When a double-sided original document is read, an image on the back surface of the original document is read with the back surface reading module 50 provided on the upstream side of the original document holder member 53, and then an image on the front surface of the original document is red with the front surface reading module 51.

Figure 4:
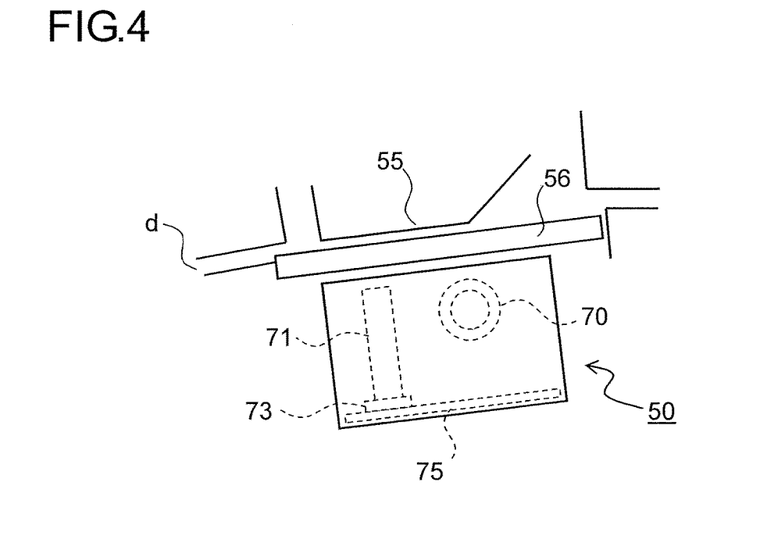
FIG. 4 is a partial enlarged view around a back surface reading module and a back surface white reference plate shown in FIG. 3.

FIG. 4 is a partial enlarged view around the back surface reading module 50 and the back surface white reference plate 55 shown in FIG. 3. As shown in FIG. 4, the back surface reading module 50 is a reading module of a CIS sensor (Contact Image Sensor, cross-contact type image sensor) method. Within the back surface reading module 50, a light source 70, a condenser lens 71 which is formed with a plurality of lenses and a CMOS (Complementary MOS) sensor 73 which serves as a reading means are provided, and light which is applied from the light source 70 and which is passed through the back surface reading glass 56 is reflected off the original document (unillustrated). The light reflected off the image plane (image light) is passed again through the back surface reading glass 56 and is collected by the condenser lens 71 so as to form an image on the CMOS sensor 73. The image light which forms the image is subjected to pixel resolution in the CMOS sensor 73 and is converted into electrical signals corresponding to the densities of the individual pixels, and thus the reading of the image is performed. The CMOS sensor 73 is supported by a CCD substrate 75.

Although here the description thereof will be omitted, the front surface reading module 51 (see FIG. 2) is also a reading module of the CIS sensor method, and includes, as with the back surface reading module 50, the light source 70, the condenser lens 71, the CMOS sensor 73 and the CCD substrate 75.

As the reading method of the front surface reading module 51, a CCD sensor method using charge coupled devices called CCDs can also be used. Since in the CCD sensor method, even an original document which has a large depth of field and which is deep is easily focused, the CCD sensor method is advantageous in that even when a book original document or an original document having recesses and projections does not make intimate contact with the contact glass, uniform reading can be performed and that the speed of reading (scanning) is high. On the other hand, the CCD sensor method is disadvantageous in that a mirror which guides the image light into the CCD sensor is needed, that the structure of a scanner unit is complicated so as to increase the size thereof and that thus the cost thereof is increased.

Incidentally, when predetermined variations in temperature and humidity are produced at the time of the turning on of the power of the image forming apparatus 100 or at the time of return from a power saving state (sleep mode), with various timings such as the time of the start of image reading processing, processing necessary for the initial setting and the adjustment of the back surface reading module 50 and the front surface reading module 51 is performed. As one type of the processing, light source turning-on confirmation processing is present in which the light source 70 of the back surface reading module 50 or the front surface reading module 51 is turned on under predetermined conditions, in which the light amount data of light reflected from the back surface white reference plate 55 or the front surface white reference plate 57 is acquired and in which thus whether or not the light source 70 is normal or abnormal is determined.

When the light source turning-on confirmation processing of the back surface reading module 50 is performed, as shown in FIG. 3, the cover member 31 is closed, and the back surface white reference plate 55 is arranged opposite the back surface reading glass 56. The output level of the CMOS sensor 73 when in this state, the light source 70 is turned on, and light applied from the light source 70 is reflected off the back surface white reference plate 55, is focused by the condenser lens 71 and is guided into the CMOS sensor 73 is acquired as the light amount data (white reference data). Then, when the light amount data acquired is equal to or more than a reference value, it is determined that the light source 70 is normally turned on whereas when the light amount data is less than the reference value, it is determined that the light source 70 is abnormal.

Here, when the light source turning-on confirmation processing is performed in a state where the cover member 31 is opened, since the back surface white reference plate 55 is separated from the back surface reading glass 56, even if the light source 70 is normally turned on, the CMOS sensor 73 cannot receive the light reflected from the back surface white reference plate 55, with the result that it is erroneously detected that the light source 70 is not turned on. Alternatively, even when the light source 70 is not turned on or an abnormally occurs in the turning on of the light source 70, in a state where the cover member 31 is opened, the CMOS sensor 73 inevitably receives ambient light, and thus it is likely that an error cannot be detected.

As described previously, the detection of whether the cover member 31 is opened or closed is performed by detecting whether the light path of the opening/closing detection sensor 60 provided on the side of the original document transport device 27 is interrupted or opened with the light interruption plate 61 provided on the side of the cover member 31. It takes a given detection time to detect whether the cover member 31 is opened or closed due to a stroke of the approach or the separation of the opening/closing detection sensor 60 with respect to the light interruption plate 61 resulting from the opening or the closing of the cover member 31, software detection processing and the like. On the other hand, since the light source turning-on confirmation processing of the back surface reading module 50 uses the CMOS sensor 73, the confirmation time thereof is short. Hence, a time lag occurs between the timing at which whether the cover member 31 is opened or closed is detected and the timing at which the light source turning-on confirmation processing is started, and thus although the opening of the cover member 31 is started, the opening of the cover member 31 cannot be detected such that the light source turning-on confirmation processing is performed, with the result that the state of the turning on of the light source 70 may be erroneously detected.

Hence, in the present embodiment, when the light source turning-on confirmation processing of the back surface reading module 50 is performed, after it is detected with the opening/closing detection sensor 60 that the cover member 31 is in a closed position, the light source 70 is turned on, and light amount data is acquired. Then, after the completion of the acquisition of the light amount data, it is detected again that the cover member 31 is in the closed position, and when it is confirmed that the cover member 31 is in the closed position, whether or not the light amount data is equal to or more than the reference value is determined.

Figure 5:
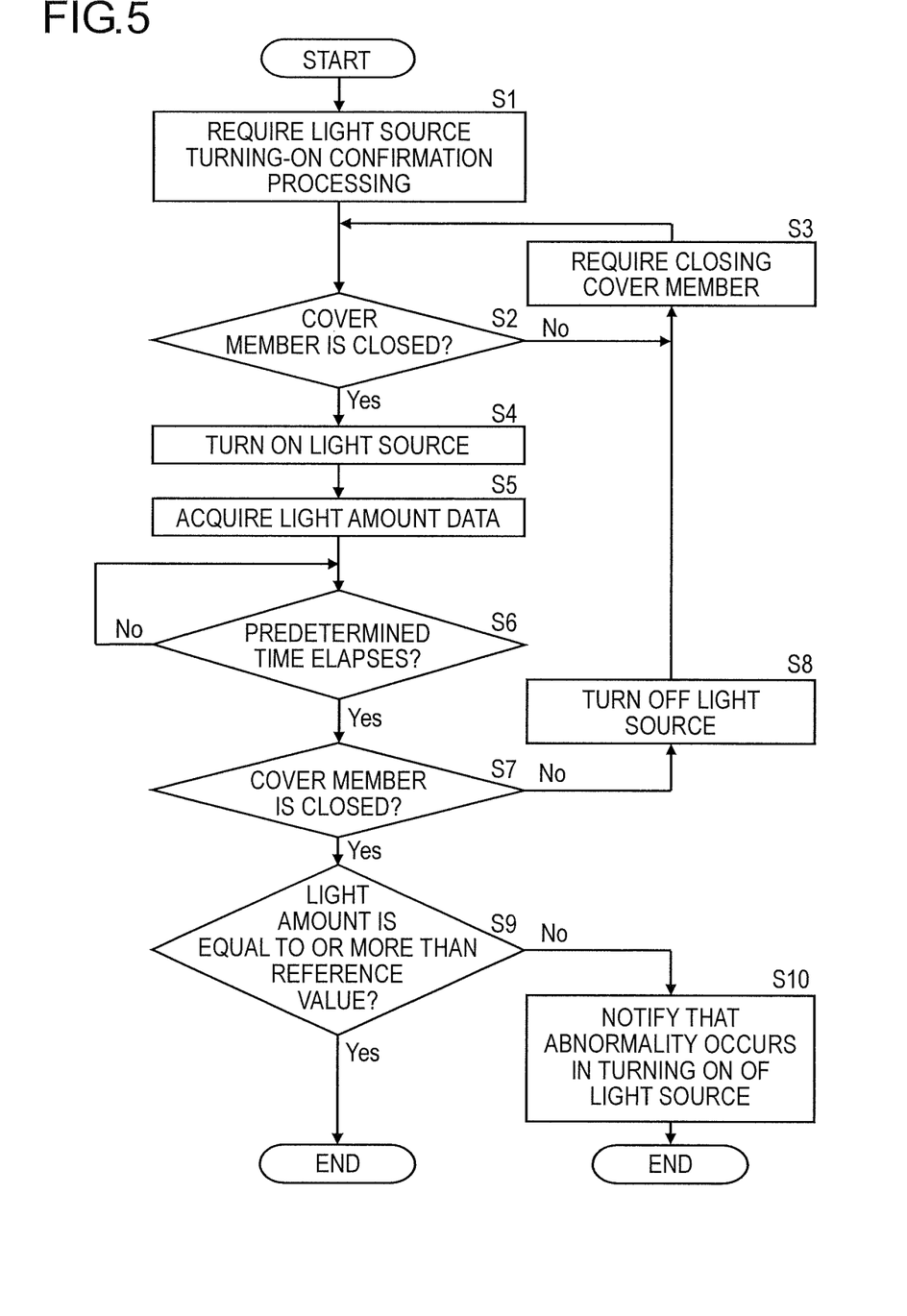
FIG. 5 is a flowchart showing an example of control when in the original document transport device of the present embodiment, the light source turning-on confirmation of the back surface reading module is performed.

FIG. 5 is a flowchart showing an example of control when the light source turning-on confirmation of the back surface reading module 50 is performed in the original document transport device 27 of the present embodiment. A procedure for performing the light source turning-on confirmation will be described along steps in FIG. 5 with reference to FIGS. 1 to 4 as necessary.

When it is required to perform the light source turning-on confirmation processing of the back surface reading module 50 with a predetermined timing such as the time of the turning on of the power of the image forming apparatus 100 or the time of return from the power saving state (sleep mode) (step S1), the control portion 90 determines, based on the detection signal transmitted from the opening/closing detection sensor 60, whether or not the cover member 31 is in the closed position (step S2, first opening/closing determination processing). When the cover member 31 is in an opened state (no in step S2), a display for requiring closing the cover member 31 is produced on the liquid crystal display portion of the operation portion 80 (step S3), and the process returns to step S2.

When the cover member 31 is in the closed position (yes in step S2), the control portion 90 turns on the light source 70 of the back surface reading module 50 (step S4). Then, the light amount data of light which is emitted from the light source 70, is reflected off the back surface white reference plate 55 and enters the CMOS sensor 73 is acquired (step S5, light amount acquisition processing).

Then, after a predetermined time has elapsed since the acquisition of the light amount data (yes in step S6), the control portion 90 determines again, based on the detection signal transmitted from the opening/closing detection sensor 60, whether or not the cover member 31 I in the closed position (step S7, second opening/closing determination processing). When the cover member 31 is in an opened position (no in step S7), since the cover member 31 may be opened during the acquisition of the light amount data, after the light source 70 is turned off (step S8), the process returns to step S3 where it is required to close the cover member 31, the process returns to step S2 and the confirmation of the closing of the cover member 31, the turning on of the light source 70 and the acquisition of the light amount data are performed again (steps S2 to S6).

When in step S7, the cover member 31 is in the closed position (yes in step S7), the control portion 90 determines whether or not the light amount acquired in step S5 is equal to or more than the predetermined reference value (step S9, light amount determination processing). Then, when the light amount is equal to or more than the reference value (yes in step S9), it is determined that the light source 70 is normally turned on, and the process is completed. On the other hand, when the light amount is less than the reference value (no in step S9), it is determined that the light source 70 is not normally turned on, a display for providing a notification that an abnormality occurs in the turning on of the light source 70 is produced in the liquid crystal display portion of the operation portion 80 (step S10) and the process is completed.

As described above, in the image reading portion 6 of the present embodiment, when the light source turning-on confirmation processing of the back surface reading module 50 is performed, the state of the opening and closing of the cover member 31 is determined before and after the acquisition of the light amount data. Then, when the cover member 31 is opened before the acquisition of the light amount data, it is required to close the cover member 31 without acquiring the light amount data. Even in a case where the cover member 31 is closed before the acquisition of the light amount data, when the cover member 31 is opened after the acquisition of the light amount data, the light amount determination processing is not performed, it is required to close the cover member 31 and the light amount data is acquired again. Hence, in a state where the cover member 31 is reliably closed, the light amount data can be acquired, and thus it is possible to prevent the state of the turning on of the light source 70 from being erroneously detected.

After the predetermined time has elapsed since the acquisition of the light amount data, the state of the closing of the cover member 31 is determined again, and thus even when it takes a given time to detect whether the cover member 31 is opened or closed, it is possible to reliably detect the state of the opening and closing of the cover member 31 after the acquisition of the light amount data. Hence, it is possible to more effectively prevent the state of the turning on of the light source 70 from being erroneously detected.

Although in the example of the control in FIG. 5, the light source 70 is turned off (step S8) when the cover member 31 is not closed (no in step S7) after the acquisition of the light amount data (step S5), a configuration may be adopted in which in a state where the light source 70 is turned on, it is required to close the cover member 31 and in which after the closing of the cover member 31 is confirmed, the light amount data is acquired again without being processed.

The present disclosure is not limited to the embodiment described above, and various modifications can be made without departing from the spirit of the present disclosure. For example, although in the embodiment discussed above, the image reading device which is formed with the image reading portion 6 and the original document transport device 27 and which includes the back surface reading module 50 arranged within the original document transport device 27 and the front surface reading module 51 arranged within the image reading portion 6 is described as an example of the image reading device, the present disclosure can likewise be applied to an image scanner which includes only one reading module that corresponds to the back surface reading module 50 described above and which is used as a member separate from the image forming apparatus 100.

The present disclosure can be utilized for an image reading device which includes a reading module arranged within an original document transport device. By the utilization of the present disclosure, it is possible to provide: an image reading device which can prevent an erroneous detection caused by the opening and closing of a cover member when the light source turning-on confirmation processing of a reading module is performed; and an image forming apparatus which includes such an image reading device.

What is claimed is:
1. An image reading device comprising:
an original document transport device that includes
an original document transport path along which an original document is passed,
a cover member which can be opened and closed in a predetermined section of the original document transport path,
an opening/closing detection sensor which detects a state of opening and closing of the cover member and a white reference plate which is arranged in the cover member and which is opposite a first reading module in a state where the cover member is closed and that transports the original document;

the first reading module that is arranged within the original document transport device, that includes a light source and a sensor for reading, as image light, light which is applied from the light source to the transported original document and which is reflected off the transported original document and that can read an image on the original document transported by the original document transport device; and a control portion that controls the first reading module, wherein the control portion can perform light source turning-on confirmation processing of the first reading module in which the light source is turned on in a state where the white reference plate is opposite the first reading module while no image is being read such that light amount data is acquired with the sensor and in which a state of turning on of the light source is determined based on whether or not the acquired light amount is equal to or more than a reference value, and when the control portion performs the light source turning-on confirmation processing, the control portion sequentially performs first opening/closing determination processing for determining the state of the opening and closing of the cover member based on a result of the detection by the opening/closing detection sensor, light amount acquisition processing for turning on the light source so as to acquire the light amount data after it is determined in the first opening/closing determination processing that the cover member is in a closed state, second opening/closing determination processing for determining again the state of the opening and closing of the cover member based on a result of the detection by the opening/closing detection sensor after the acquisition of the light amount data in the light amount acquisition processing and light amount determination processing for determining, after it is determined in the second opening/closing determination processing that the cover member is in the closed state, whether or not the light amount is equal to or more than the reference value.

2. The image reading device according to claim 1, wherein the control portion performs the second opening/closing determination processing after a predetermined time has elapsed since the acquisition of the light amount data in the light amount data acquisition processing.

3. The image reading device according to claim 1, further comprising:
a notification device that provides a predetermined notification according to a requirement from the control portion, wherein when it is determined in the first opening/closing determination processing that the cover member is in an opened state, the control portion provides, with the notification device, a notification that the closing of the cover member is required.

4. The image reading device according to claim 1, further comprising:
a notification device that provides a predetermined notification according to a requirement from the control portion, wherein when it is determined in the second opening/closing determination processing that the cover member is in an opened state, the control portion provides, with the notification device, a notification that the closing of the cover member is required, and returns to the first opening/closing determination processing so as to perform the light source turning-on confirmation processing again.

5. The image reading device according to claim 1, further comprising:
a notification device that provides a predetermined notification according to a requirement from the control portion, wherein when it is determined in the light amount determination processing that the light amount is less than the reference value, the control portion provides, with the notification device, a notification that an abnormality occurs in the turning on of the light source.

6. The image reading device according to claim 1, wherein the first reading module is a close-contact type image sensor.

7. The image reading device according to claim 1, further comprising:
a contact glass that is fixed to an upper surface of a scanner frame; and
a second reading module that is arranged below the contact glass so as to be able to reciprocate in a subscanning direction, wherein the first reading module can read an image on a side of a back surface of the transported original document, and the second reading module can read an image on a side of a front surface of an original document manually placed on the contact glass while reciprocating in the subscanning direction and can also read an image on a side of a front surface of the original document transported to an upper surface of the contact glass in a state where the image is stopped in a reading position.

8. An image forming apparatus comprising:
the image reading device according to claim 1; and
an image forming portion which forms, on a sheet, the image read by the image reading device.

* * * * *